April 3, 1934.  A. W. REETZ  1,953,365
TRAILER COUPLING
Filed May 23, 1932   2 Sheets-Sheet 1
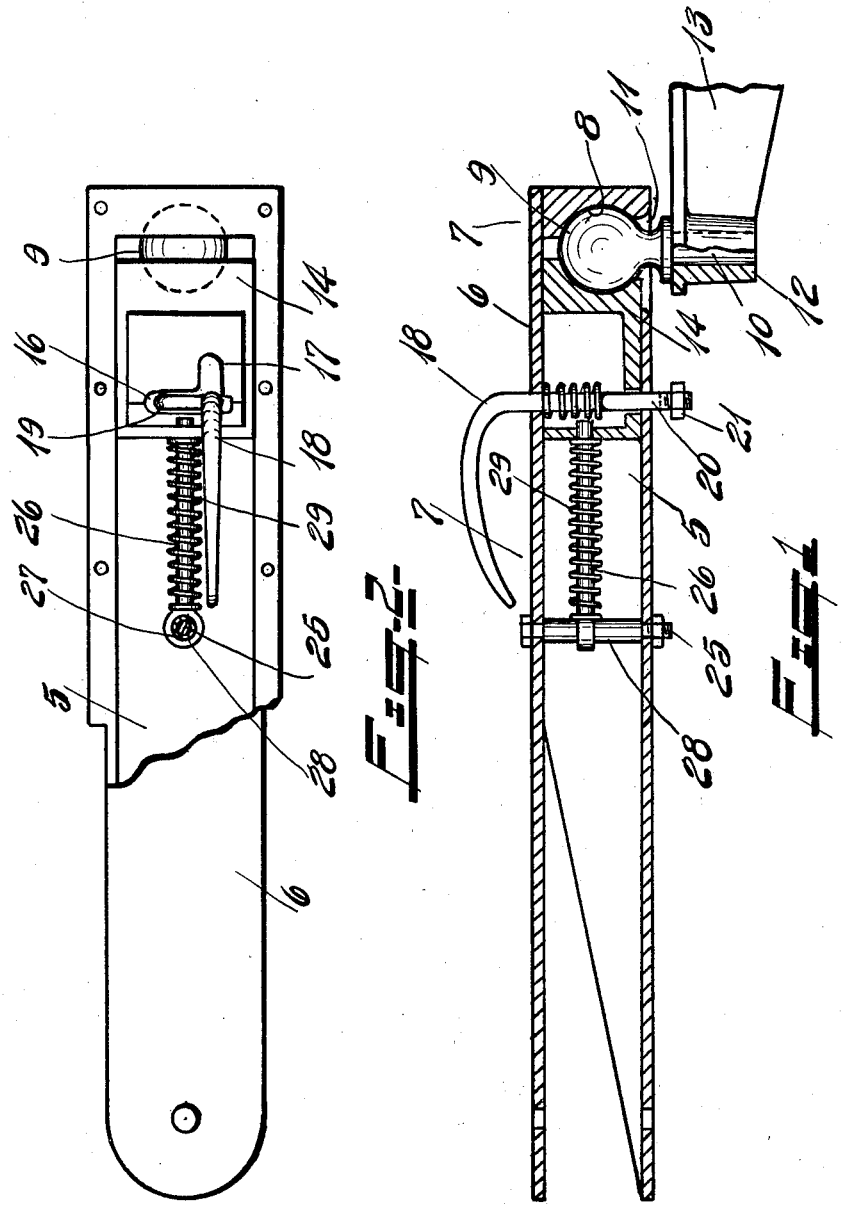
INVENTOR.
August W. Reetz.
BY
Frank G. Fearman.
ATTORNEY.

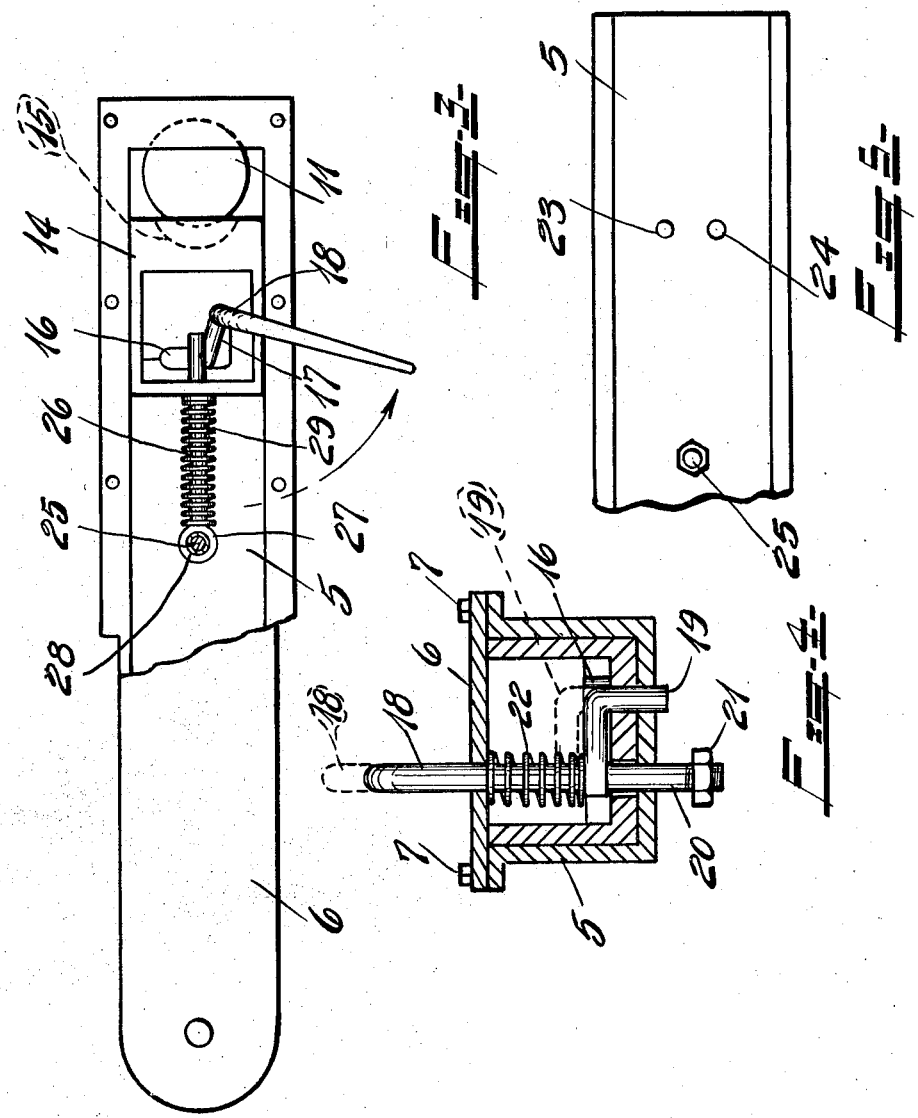

Patented Apr. 3, 1934

1,953,365

UNITED STATES PATENT OFFICE 1,953,365

TRAILER COUPLING

August W. Reetz, Bay City, Mich.

Application May 23, 1932, Serial No. 612,914

5 Claims. (Cl. 280—33.15)

This invention relates to couplings, and more specifically to a coupling for securing a trailer to a driven, or power propelled vehicle.

One of the prime objects of the invention is to design a coupling which is of simple and substantial construction, and which can be quickly and easily coupled to or uncoupled from the vehicle to which it is attached.

Another object is to design a positive locking coupling composed of few parts, all of which are economical to manufacture and assemble.

A further object is to provide a coupling which provides a universal movement, which can be readily assembled for repair and replacement, and which is efficient in operation.

The above and other objects will appear as the specification progresses, reference being had to the accompanying drawings, in which I have shown the preferred embodiment of my invention, and in which like reference numerals indicate like parts throughout the several views thereof.

In the drawings—

Fig. 1 is a sectional side view of my trailer coupling.

Fig. 2 is a top plan view, the cover being broken away to show the interior.

Fig. 3 is also a similar top plan view, with the mechanism shown in unlocked position.

Fig. 4 is an enlarged transverse sectional view taken on the line 4—4 of Fig. 1.

Fig. 5 is a fragmentary bottom view.

The coupling shown on the attached drawings is adapted for use in attaching to any vehicle, tractor, or other conveyance, and comprises a housing 5 provided with a cover plate 6 which is held in place by bolts 7 as usual, the front end of the housing forming one section of a spheroidal socket 8 for seating a ball member 9, and which forms one part of a universal ball and socket arrangement. A stem member 10 is formed integral with said ball and projects through the opening 11 provided in the housing, and is adapted to be mounted in a bearing 12 provided in a member 13 which forms a part of, or is provided on the power vehicle (not shown).

A block member 14 is slidably mounted in the housing 5, the front wall being shaped to conform to the front wall of the housing for completing the other section 15 of the spheroidal socket, slotted passages 16 and 17 respectively being formed in the bottom wall of this block to accommodate the locking lever 18, said locking lever being formed with an offset leg 19, which is shorter than the leg 20, said leg 20 being threaded to receive a nut 21 in the usual manner.

A coiled spring 22 is mounted on the shank of the locking handle, and is interposed between the leg 19 and the cover of the housing and tends to force the legs downwardly through the openings 23 and 24 provided in the bottom wall of the housing to lock the block rigidly in position.

When unlocking the coupling, either for the purpose of attaching or detaching the ball 9, the locking handle is first raised until the leg 19 is clear of the bottom wall of the housing (the nut 21 limiting said raising movement); the handle is then swung to position as shown in Fig. 3 of the drawings, the leg 19 engaging the side wall of the slot 16, forcing the block rearwardly to permit easy removal of the ball 9 through the opening 11, the slot 17 accommodating the leg 19 of the bolt so that the block may freely slide.

A vertically disposed bolt 25 is provided intermediate the length of the housing, and a horizontally disposed plunger 26 is connected thereto, said plunger being provided with an eye 27 which engages said bolt; separators 28 are also provided on the bolt for spacing the plunger, the opposite end of the plunger projecting through a suitable opening provided in the end wall of the block 14, and a spring 29 is interposed between said block and bolt, so that it is the tendency to at all times force the block towards the front wall and into locked position, and when the legs 19 and 20 are in position to register with the openings 23 and 24 in the housing, the spring 22 forces the handle to locked position. The operation is quick and easy, the handle is readily accessible, and the locking action is simple and positive.

The housing proper extends rearwardly as shown, so that the tongue or polepiece of the vehicle to be drawn (not shown) can be secured thereto, an opening 30 being provided in said housing to facilitate the attachment.

From the foregoing description it will be clearly obvious that I have perfected a very simple, substantial, and practical coupling for coupling trailers and the like to power driven vehicles.

What I claim is:

1. A trailer coupling comprising a housing provided with spaced apart openings, a block member mounted to slide in said housing, a spheroidal socket formed in said housing and block member, a ball mounted in said socket, and a locking lever mounted on said housing and adapted in one position to lock said block in position in said housing, and in another position to move said block longitudinally therein.

2. A trailer coupling comprising a housing, a block member mounted to slide therein, a socket formed in the block and end wall of the housing, and a vertically adjustable forked locking lever engaging said housing for locking the block therein.

3. A trailer coupling comprising a housing, a block member mounted to slide therein, the end wall of the housing and block respectively being shaped to form a socket, a ball detachably mounted therein, a forked locking member rotatably mounted in said block and normally engaging said housing for locking said block therein, said locking member slidably adjusting said block when rotated to release said ball, and means for forcing said block to locked position.

4. A trailer comprising a housing, a block member mounted to slide therein, the end wall of the housing and block respectively being shaped to form a socket, a ball detachably mounted in said socket, a locking lever pivotally mounted in said housing and provided with an offset leg for detachably engaging the housing and block respectively, resilient means mounted on said lever, said lever being adapted to be raised and rotated to slide said block rearwardly in the housing, and resilient means for forcing said block back to original position.

5. A trailer comprising a housing having an opening in the bottom wall thereof, a block member mounted to slide in said housing and provided with grooves in the bottom wall thereof, the end wall of the block and housing respectively being shaped to form a socket, a ball rotatably mounted in said socket, a locking handle pivotally mounted in said housing and formed with an offset leg for locking the block to the housing, a spring mounted on said handle, said handle being adapted to be raised so that the offset leg clears the bottom wall of the housing for slidably adjusting said block as the handle is rotated, and resilient means for forcing said block back to original position.

AUGUST W. REETZ.